United States Patent [19]

Ogawa et al.

[11] Patent Number: 5,127,371

[45] Date of Patent: Jul. 7, 1992

[54] INTAKE MANIFOLD

[75] Inventors: Seiichi Ogawa; Minobu Sukimoto; Hitoshi Akiyoshi, all of Tochigi, Japan

[73] Assignee: Showa Aluminum Corporation, Osaka, Japan

[21] Appl. No.: 601,155

[22] Filed: Oct. 10, 1990

[30] Foreign Application Priority Data

Oct. 11, 1989 [JP] Japan .................................. 1-264336

[51] Int. Cl.$^5$ .............................................. F02M 35/10
[52] U.S. Cl. ......................... 123/52 MV; 123/52 MC; 123/432
[58] Field of Search ......... 123/52 M, 52 MB, 52 MC, 123/52 MV, 432

[56] References Cited

U.S. PATENT DOCUMENTS

| | | | |
|---|---|---|---|
| 4,702,203 | 10/1987 | Ohmi et al. | 123/52 MV |
| 4,854,271 | 8/1989 | Miyano et al. | 123/52 MB |
| 4,911,111 | 3/1990 | Matsuraga | 123/52 MB |
| 5,000,129 | 3/1991 | Fukada et al. | 123/52 MV |

Primary Examiner—David A. Okonsky
Attorney, Agent, or Firm—Armstrong, Nikaido, Marmelstein, Kubovcik & Murray

[57] ABSTRACT

An intake manifold adapted for use with an engine having two intake ports for each cylinder incorporates an aluminum plenum chamber having an air inlet and air outlets twice the number of cylinders of the engine in number, and a plurality of branch pipes of wrought aluminum connected to the respective air outlets of the plenum chamber. One of the two branch pipes to be connected to the intake ports for each cylinder is larger in the length of the channel than the other branch pipe. The two branch pipes are equal in the cross sectional area of the pipe channel, or the branch pipe having the longer channel is smaller than the other branch pipe in the cross sectional area of the channel. The roughness of the inner surface of each branch pipe is up to 10 μm, preferably up to 5 μm, more preferably up to 1 μm, in terms of center line average height.

6 Claims, 7 Drawing Sheets

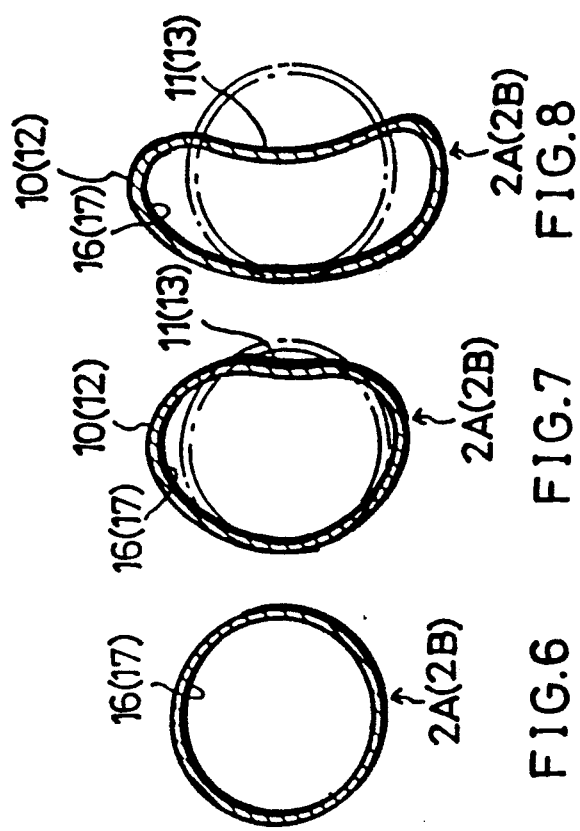
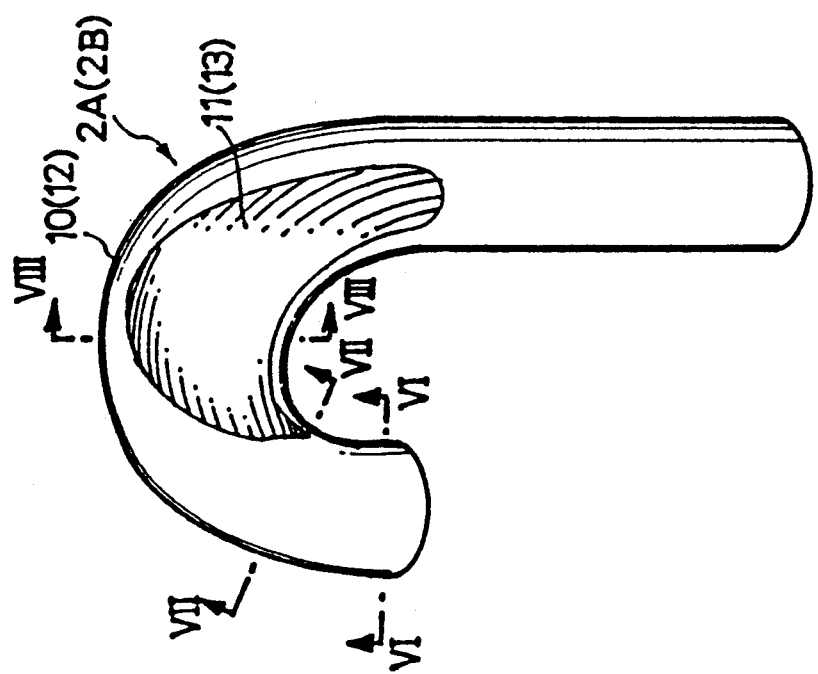

INTAKE MANIFOLD

BACKGROUND OF THE INVENTION

The present invention relates to an intake manifold, for example, for use with motor vehicle engines.

The term "aluminum" as used herein and in the claims includes pure aluminum and aluminum alloys. The term "wrought aluminum" as used herein and in the claims refers to an article of aluminum prepared by extrusion, impact extrusion, forging or like plastic working process. Further the term "center line average height" is used herein and in the claims according to the definition of JIS B0601-1982.

For example, motor vehicle engines have recently been proposed which have two intake ports formed for each of its cylinders and each provided with a valve to achieve improved performance. In the high speed range of engine rotation, air or fuel-air mixture is supplied to the two intake ports provided for each cylinder, while in the low-to-medium speed range of rotation, air or fuel-air mixture is supplied to only one of the two intake ports so as to obtain a high output and high torque in the high speed range and to obtain a high output and high torque in the low-to-medium speed range.

For such engines, an intake manifold has heretofore been used which is made of a casting in its entirety and which comprises a plenum chamber and branches connected to the respective intake ports.

For the engine to give a high output and high torque especially in the low-to-medium speed range, it is desired that the branch channel connected to the intake port to which air or fuel-air mixture is supplied in both the high speed range and the low-to-medium speed range be larger in length and smaller in cross sectional area than the branch channel connected to the other intake port to which air or fuel-air mixture is supplied only in the high speed range so as to introduce air or fuel-air mixture into the cylinder at an increased flow velocity in the low-to-medium speed range.

In the case of the cast intake manifold, however, it is difficult to design the two branch channels with such lengths and cross sectional areas a to give an ideal flow velocity to the air or fuel-air mixture. In fact, this is impossible if the engine has many cylinders. The reason is that although the intake manifold needs to be compact because the space available for the motor vehicle engine room is limited, the cast intake manifold fails to fulfill the requirement when so sized as to be accommodated in the engine room.

Moreover, the cast intake manifold has the problem of increased weight since the thickness of the peripheral wall can not be reduced beyond a certain limit in view of the flowability of the molten metal to be cast. The casting is rough-surfaced, has voids and must therefore be internally smooth-surfaced by finishing to ensure reduced air resistance for an improved intake efficiency. Thus, the cast manifold has the problem of necessitating a cumbersome finishing procedure. Nevertheless, it is impossible to finish the entire inner surface of the intake manifold in view of its configuration and accordingly to fully reduce the air resistance for an improved intake efficiency.

SUMMARY OF THE INVENTION

The main object of the present invention is to provide an intake manifold free of the foregoing problems.

The intake manifold of the present invention is adapted for use with an engine having two intake ports for each cylinder and comprises an aluminum plenum chamber having an air inlet and air outlets twice the number of cylinders of the engine in number, and a plurality of branch pipes of wrought aluminum connected to the respective air outlets of the plenum chamber, one of the two branch pipes to be connected to the intake ports for each cylinder being larger in the length of the channel than the other branch pipe.

With the intake manifold of the present invention, one of the two branch pipes to be connected to the intake ports for each cylinder has a larger channel length than the other branch pipe. This makes it possible to give an increased flow velocity to the air or fuel-air mixture to be introduced into the cylinder via the intake port to which the longer branch pipe is connected, permitting the point of ignition within the cylinder to effect wide-spread combustion rapidly to achieve an improved combustion efficiency. The two branch pipe channels may be made to have equal cross sectional areas. Alternatively, the longer branch pipe channel may be smaller than the other channel in cross sectional area. In the latter case, the air of fuel-air mixture can be given a further increased velocity for the cylinder to attain a still improved combustion efficiency, enabling the engine to produce a higher output and higher torque in the low-to-medium speed range of rotation. In the high speed range of rotation, large amounts of air of fuel-air mixture flow into the cylinder through the branch pipes connected to the two intake ports. Thus, a large quantity of air can be supplied to the cylinder to give a high output and high torque, consequently permitting the engine to exhibit improved performance.

Since the branch pipes are made of wrought aluminum, the length and cross sectional area of the channels can be easily so determined as to give an optimal velocity to the air or fuel-air mixture to be introduced into the cylinder and to achieve the highest possible combustion efficiency. Consequently, the manifold can be accommodated in the limited space of the engine room.

Further because the branch pipes are made of wrought aluminum, the pipes can be made more smooth-surfaced internally than cast pipes to result in decreased air resistance and improved intake efficiency. Moreover, the pipes need not always be finished unlike the conventional casting and can be made more lightweight than the conventional casting. The roughness of the inner surface of the branch pipe is up to 10 $\mu$m, preferably up to 5 $\mu$m, more pareferably up to 1 $\mu$m, in terms of center line average height.

The present invention will be described in greater detail with reference to the accompanying drawings.

BRIEF DESCRIPTION OF THE DRAWINGS

FIG. 5 is a perspective view showing a central branch pipe;

FIG. 6 is an enlarged view in section taken along the line VI—VI in FIG. 5;

FIG. 7 is an enlarged view in section taken along the line VII—VII in FIG. 5;

FIG. 8 is an enlarged view in section taken along the line VIII—VIII in FIG. 5;

DESCRIPTION OF THE PREFERRED EMBODIMENTS

Figure 1:
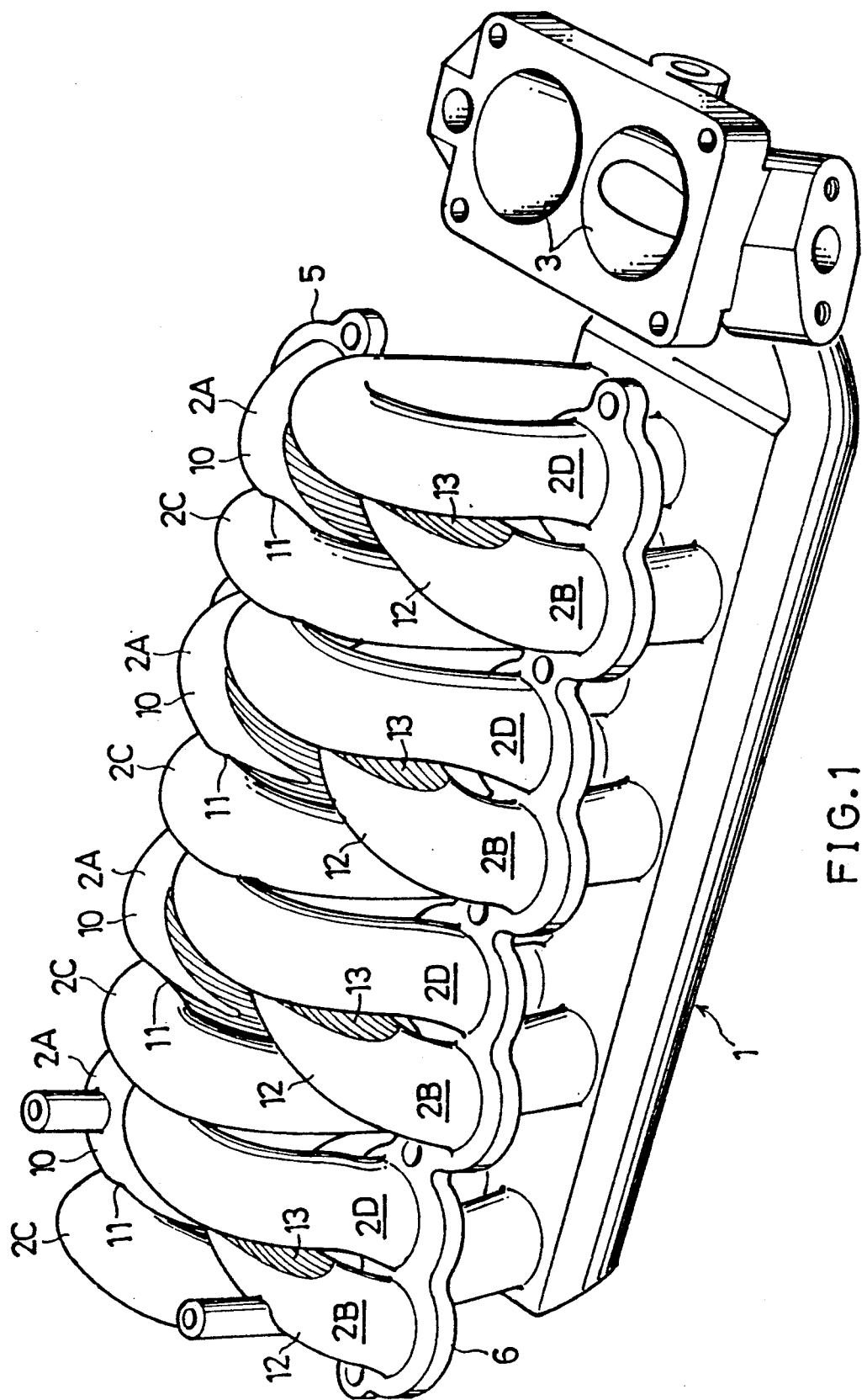
FIG. 1 is a perspective view showing an intake manifold embodying the invention.
Figure 2:
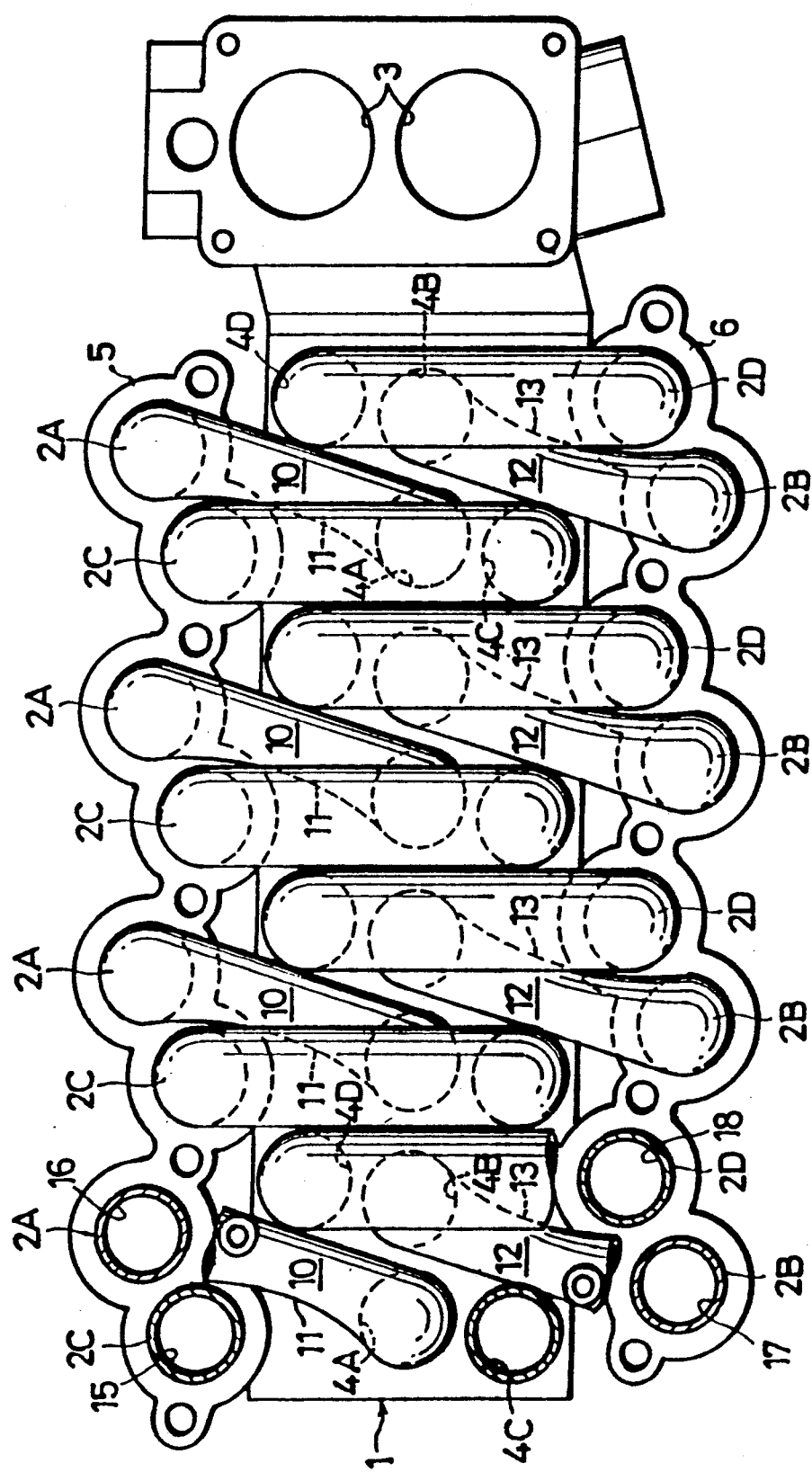
FIG. 2 is a plan view partly broken away and showing the manifold.
Figure 3:
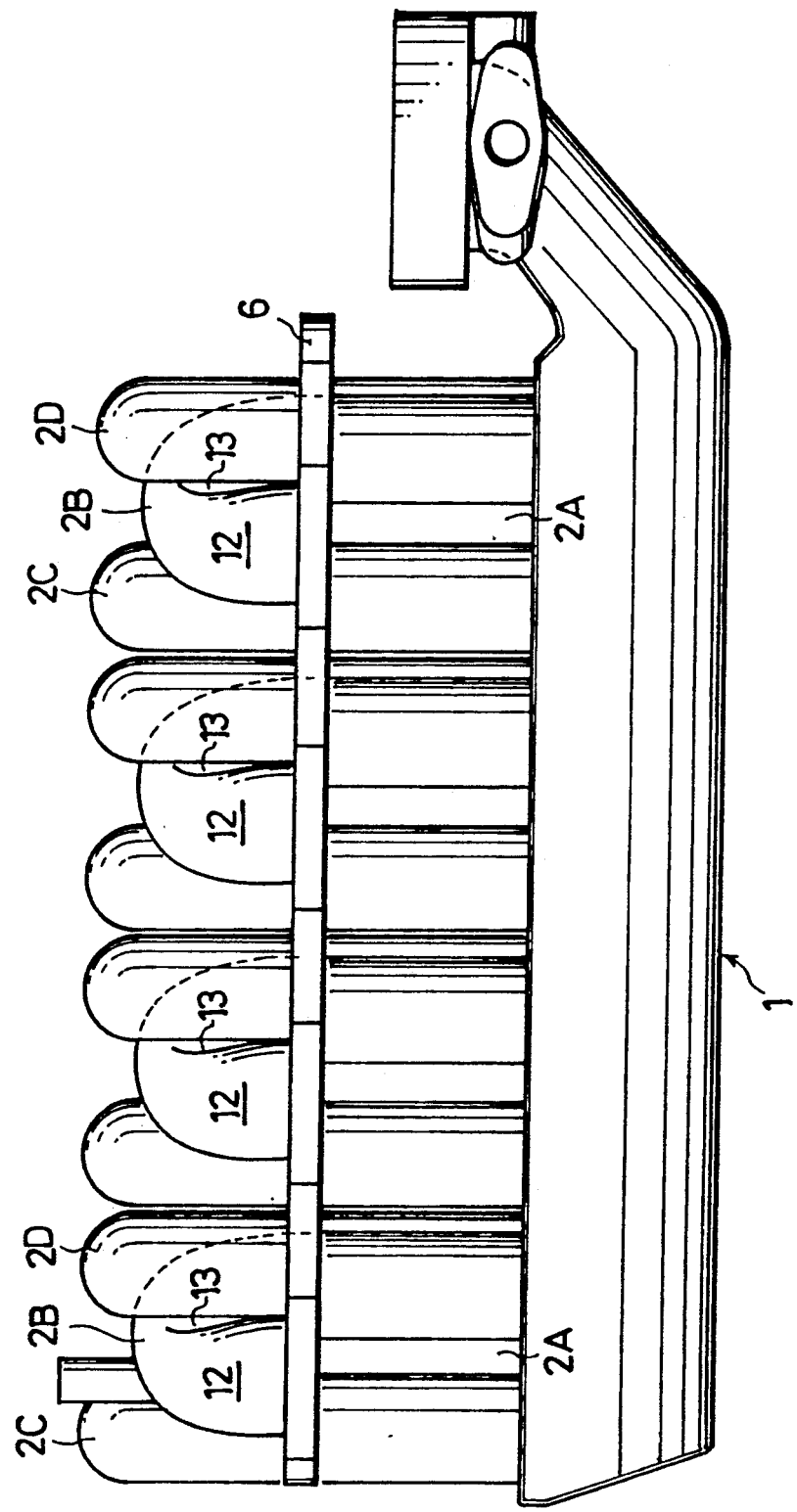
FIG. 3 is a side elevation of the manifold.
Figure 4:
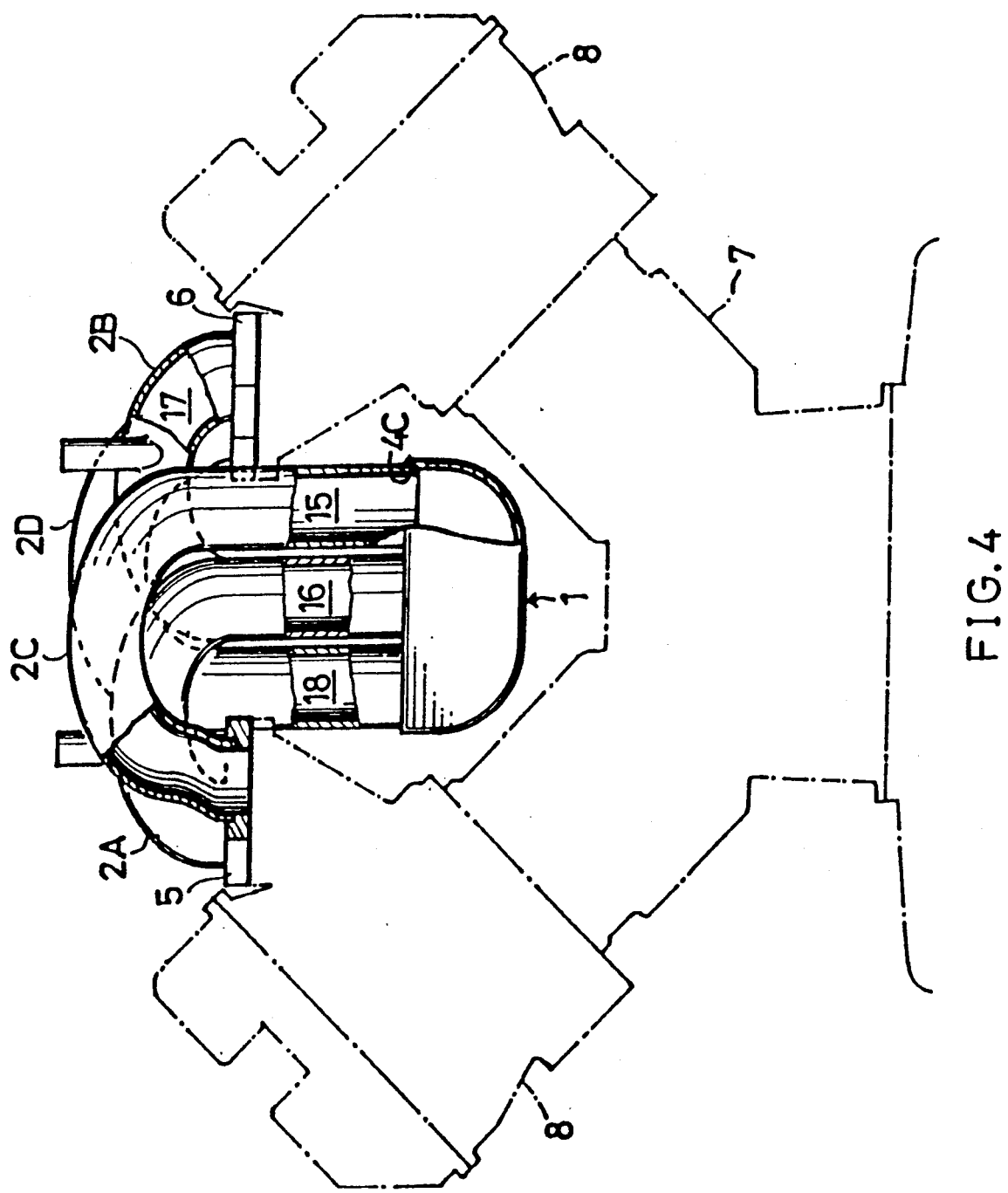
FIG. 4 is a rear view partly broken away and showing the manifold.

In the following description, the right-hand side of FIG. 2 will be referred to as "front," the left-hand side thereof as "rear," the upper side thereof as "left," and the lower side thereof as "right." The terms "upper" and "lower" are used as the embodiment is seen as illustrated in FIGS. 3 and 4.

FIGS. 1 to 4 show an intake manifold for use with motor vehicle engines having V-type eight cylinders each formed with two intake ports and two exhaust ports. The engine has a device for injecting fuel into the manifold. Each of the ports has a valve. In the low-to-medium speed range of rotation, only the valve provided for one of the two intake ports for each cylinder operates. In the high speed range of rotation, both the valves provided for the two intake ports operate.

With reference to FIGS. 1 to 4, the intake manifold comprises a hollow plenum chamber 1 of aluminum, and sixteen branch pipes 2A, 2B, 2C and 2D of wrought aluminum connected to the plenum chamber 1.

The plenum chamber 1 has at its front end portion two air inlets 3. An air supply duct (not shown) extending from an air cleaner is connected to each air inlet 3. The upper wall of the plenum chamber 1 is formed in the widthwise central portion thereof with eight central air outlets 4A and 4B arranged in the front-to-rear direction at a predetermined spacing. Four right air outlets 4C are formed in the upper wall at the right side of the respective even-numbered four central air outlets 4A (first central air outlets) as the eight air outlets 4A, 4B are numbered from the front. Four left air outlets 4D are formed at the left side of the respective odd-numbered four central air outlets 4B (second central air outlets). Branch pipes 2A to 2D, generally inverted J-shaped when seen from the front, are connected to all the air outlets 4A to 4D, respectively. Each branch pipe 2A (first central branch pipe) connected to the first central air outlet 4A and each branch pipe 2C (right branch pipe) connected to the right air outlet 4C are connected at their forward ends to a flange 5 disposed at the left side of the plenum chamber 1 for connection to a cylinder head. Each branch pipe 2B (second central branch pipe) connected to the second central air outlet 4B and each branch pipe 2D (left branch pipe) connected to the left air outlet 4D are connected at their forward ends to a flange 6 disposed at the right side of the plenum chamber 1 for connection to a cylinder head. As seen in FIG. 4, the flanges 5, 6 are attached to the cylinder heads 8 of a V-type 8-cylindered engine 7. Each pair of adjacent first central branch pipe 2A and right branch pipe 2C, as well as each pair of adjacent second central branch pipe 2B and left branch pipes 2D, is connected to the intake ports (not shown) of one of the cylinders of the engine 7.

The first central branch pipes 2A and the second central branch pipes 2B are connected to the intake ports provided with the valves which are opened and closed in the high speed range only and which are closed in the low-to-medium speed range. The right branch pipes 2C and the left branch pipes 2D are connected to the intake ports provided with the valves which are opened and closed in both the high speed range and the low-to-medium speed range. The first central branch pipe 2A extends from under the right branch pipe 2C, which is paired therewith, obliquely leftwardly forward. The channel 15 of the right branch pipe 2C is longer than the channel 16 of the first central branch pipe 2A paired therewith. The channels 15, 16 of these branch pipes 2C, 2A are equal to each other in cross sectional area. The first central branch pipe 2A is deformed as at 10 at a lengthwise intermediate portion thereof. The outer peripheral surface of the deformed portion 10 has a clearance area 11 so as to be free from contact with the right branch pipe 2C. The second central branch pipe 2B extends from under the left branch pipe 2D, which is paired therewith, obliquely rightwardly rearward. The channel 18 of the left branch pipe 2D is longer than the channel 17 of the second central branch pipe 2B paired therewith. The channels 18, 17 of these branch pipes 2D, 2B are equal to each other in cross sectional area. The second central branch pipe 2B, which has the same shape as the first central branch pipe 2A, is deformed as at 12 at a lengthwise intermediate portion thereof. The outer peripheral surface of the deformed portion 12 has a clearance area 13 so as to be free from contact with the left branch pipe 2D. FIG. 5 shows the central branch pipe 2A (2B). The pipe 2A (2B) has the deformed portion 10 (12) at a bend. In cross section, the inner peripheral surface of the central branch pipe 2A (2B) defining the channel 16 (17) is circular over a specified length toward the flange 5 (6) and over a specified length toward the air outlet 4A (4B) (see FIG. 6). At the deformed portion 10 (12), the channel 16 (17) is approximately elliptical in cross section, and the clearance area 11 (13) gradually enlarges from opposite ends of the deformed portion 10 (12) toward the midpoint of the length thereof (see FIGS. 7 and 8). The deformed portion 10 (12) is substantially equal to the circular portion in the cross sectional area of the channel 16 (17).

Each of the branch pipes 2A to 2D is prepared from a tubular material having a circular cross section and made, for example, of an aluminum extrudate. The roughness of the inner surface of the branch pipe is up to 10 $\mu$m, preferably up to 5 $\mu$m, more preferably up to 1 $\mu$m, in terms of center line average height.

With the construction described above, the channels 15, 18 of the right branch pipes 2C and the left branch pipes 2D are longer than the channels 16, 17 of the first and second central branch pipes 2A, 2B. Accordingly, the fuel-air mixture flows into the cylinders at a higher velocity from the right and left branch pipes 2C, 2D than from the first and second central branch pipes 2A, 2B.

Figure 9:
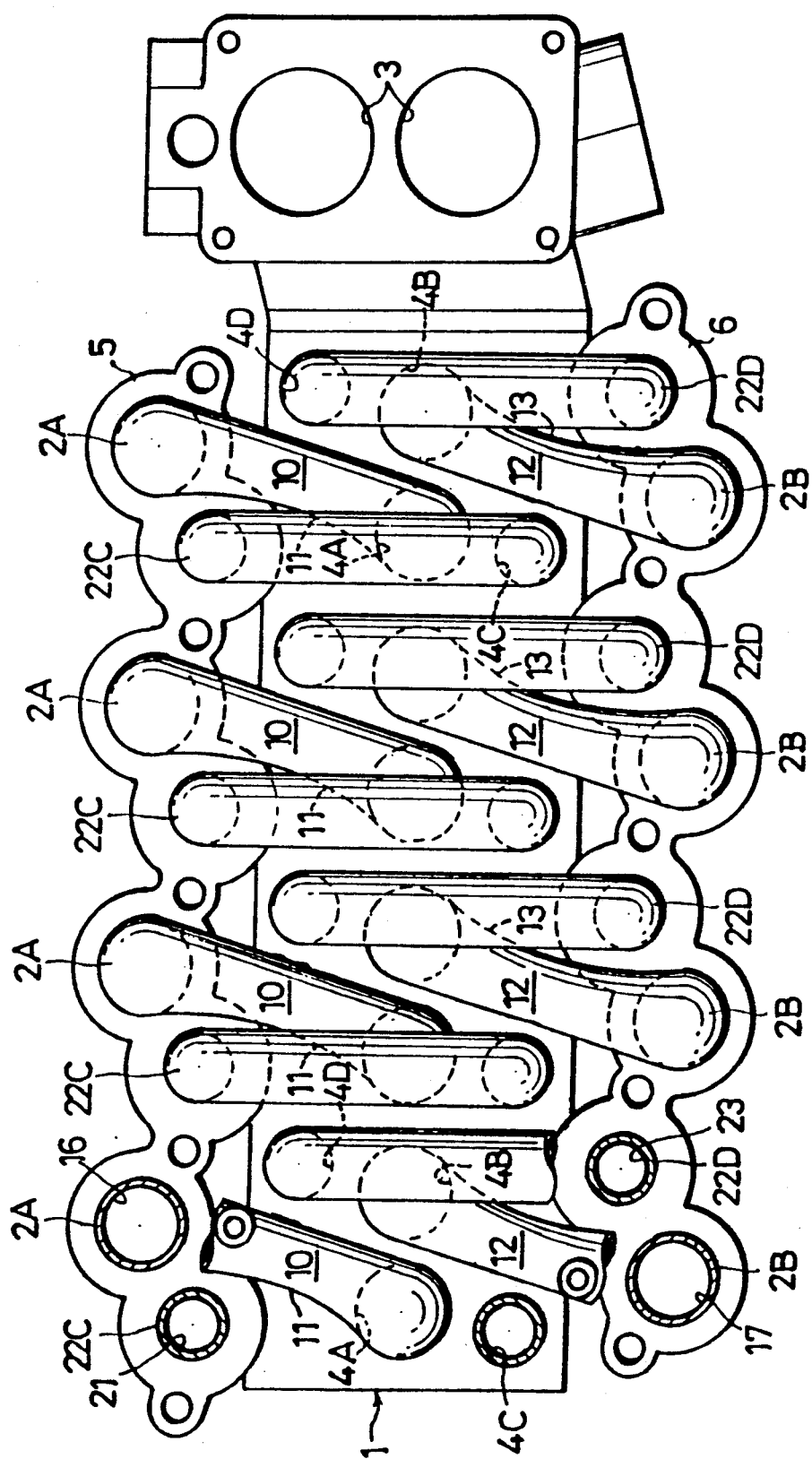
FIG. 9 is a plan view partly broken away and showing another intake manifold embodying the invention.
Figure 10:
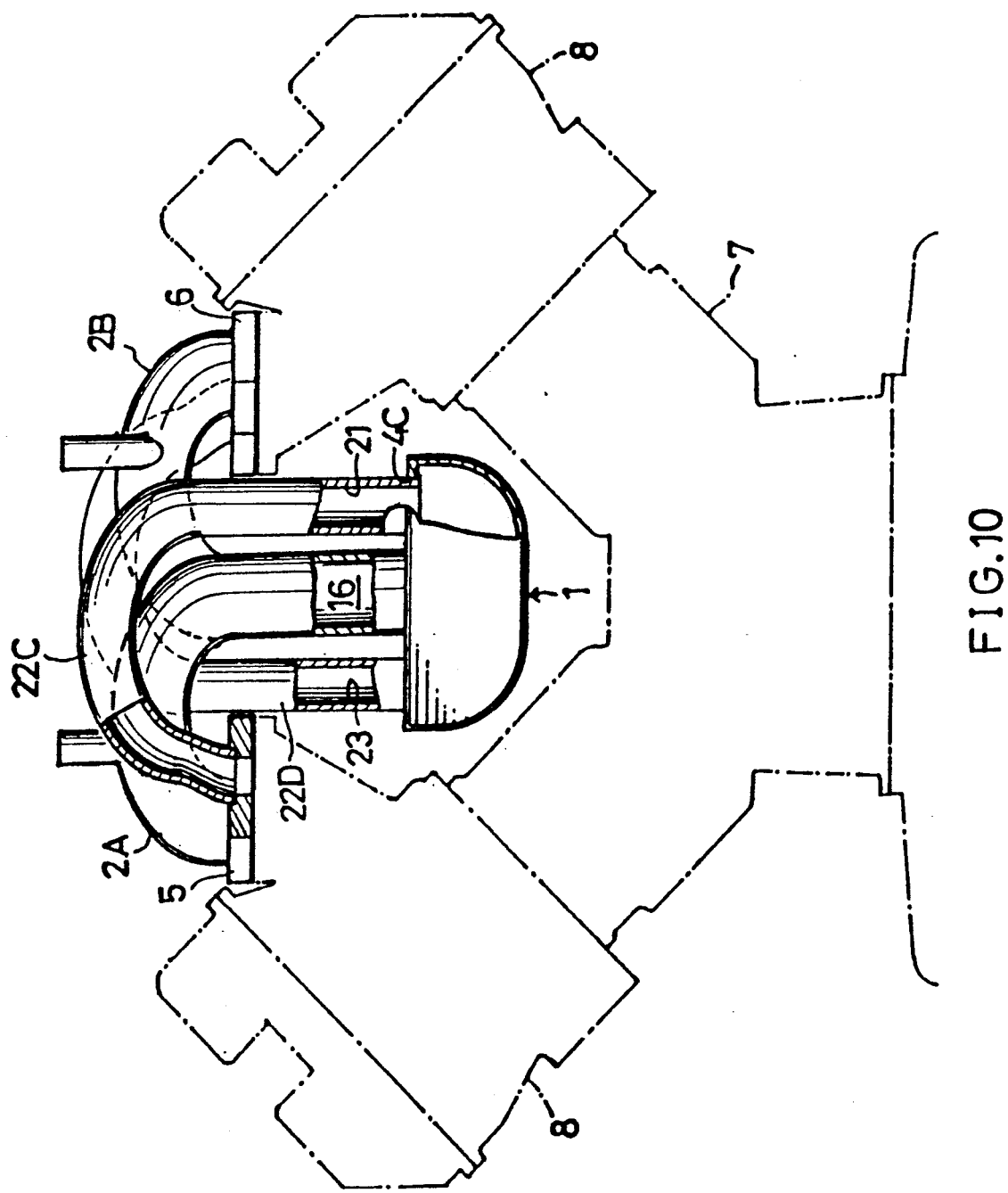
FIG. 10 is a rear view partly broken away and showing the same.

FIGS. 9 and 10 show another embodiment of the invention. With reference to these drawings, the channel 21 of each right branch pipe 22C is smaller than the channel 16 of each first central branch pipe 2A in its cross sectional area. The channel 23 of each left branch pipe 22D is similarly smaller than the channel 17 of each second central branch pipe 2B. With the exception of this feature, the second embodiment has the same construction as the first. Throughout the drawings, like parts are designated by like reference numerals or symbols.

According to the second embodiment, the channels 21 of the right branch pipes 22C are larger in length and smaller in cross sectional area than the channels 16 of the first central branch pipes 2A. The channels 23 of the left branch pipes 22D are larger in length and smaller in cross sectional area than the channels 17 of the second central branch pipes 2B. Accordingly, the fuel-air mixture flows into the cylinders from the right and left branch pipes 22C and 22D at a higher velocity than in the case of the first embodiment.

The intake manifold described above is usable for engines equipped with a carburetor and also for those equipped with a fuel injector. In the case of engines having the carburetor, a fuel-air mixture flows into the cylinders. In the case of engines having the fuel injector, the injection system differs with the position of injection; the fuel is injected into the manifold, at the intake ports, or directly into the cylinders. With the manifold injection and intake port injection, the fuel-air mixture flows into the cylinders, while in the case of cylinder injection, air flows into the cylinders. Further the systems employed for such engines for supplying air or fuel-air mixture to the two intake ports provided for each cylinder in the high-speed range and supplying air or fuel-air mixture to only one of the two intake ports in the low-to-medium speed range include, for example, one for stopping the operation of the valve provided for one of the intake ports in the low-to-medium speed range, and another one wherein a valve provided in one of the branch pipes is closed in the low-to-medium speed range.

What is claimed is:

1. An intake manifold for use with an engine having two intake ports for each cylinder, the intake manifold comprising:

an aluminum plenum chamber having an air inlet and air outlets numbering twice the number of cylinders of the engine; and a plurality of branch pipes of wrought aluminum connected to respective air outlets of said plenum chamber, said plurality of branch pipes being positioned so as to have two branch pipes connected to two respective intake ports of each cylinder of the engine, one of said two branch pipes to be connected to the intake ports for each cylinder being larger in channel length than the other of said two branch pipes.

2. An intake manifold as defined in claim 1 wherein said two branch pipes to be connected to the respective air intake ports for each cylinder are equal in channel cross sectional area.

3. An intake manifold as defined in claim 1 wherein one of said two branch pipes to be connected to the respective intake ports for each cylinder is larger in channel length and smaller in channel cross sectional area than the other of said two branch pipes.

4. An intake manifold as defined in claim 1 wherein roughness of an inner surface of each of said plurality of branch pipes is up to 10 $\mu$m in center line average height.

5. An intake manifold as defined in claim 1 wherein roughness of an inner surface of each of said plurality of branch pipes is up to 5 $\mu$m in center line average height.

6. An intake manifold as defined in claim 1 wherein roughness of an inner surface of each of said plurality of branch pipes is up to 1 $\mu$m in center line average height.

* * * * *